(12) United States Patent
Jajtic et al.

(10) Patent No.: US 7,859,143 B2
(45) Date of Patent: Dec. 28, 2010

(54) ELECTRIC MOTOR WITH SELF-COOLING

(75) Inventors: Zeljko Jajtic, München (DE); Gerhard Matscheko, Starnberg (DE)

(73) Assignee: Siemens Aktiengesellschaft, München (DE)

( * ) Notice: Subject to any disclaimer, the term of this patent is extended or adjusted under 35 U.S.C. 154(b) by 118 days.

(21) Appl. No.: 12/438,066

(22) PCT Filed: Aug. 10, 2007

(86) PCT No.: PCT/EP2007/058324

§ 371 (c)(1),
(2), (4) Date: Feb. 19, 2009

(87) PCT Pub. No.: WO2008/022934

PCT Pub. Date: Feb. 28, 2008

(65) Prior Publication Data

US 2010/0219702 A1    Sep. 2, 2010

(30) Foreign Application Priority Data

Aug. 22, 2006  (DE)  ......................  10 2006 039 368

(51) Int. Cl.
    *H02K 41/02*    (2006.01)
(52) U.S. Cl. .................................. 310/12.29
(58) Field of Classification Search ............. 310/12.04, 310/12.11, 12.21, 12.22, 12.29, 12.31; 355/53, 355/72; 29/596–598
See application file for complete search history.

(56) References Cited

U.S. PATENT DOCUMENTS

| | | | |
|---|---|---|---|
| 3,590,290 A | | 6/1971 | Ruelle et al. |
| 5,128,569 A | * | 7/1992 | Gladish ............... 310/12.11 |
| 5,834,862 A | * | 11/1998 | Hartzell, Jr. ............ 310/12.29 |
| 6,114,781 A | * | 9/2000 | Hazelton et al. ......... 310/12.29 |
| 6,300,691 B1 | * | 10/2001 | Hwang et al. ........... 310/12.29 |
| 6,313,550 B1 | * | 11/2001 | Binnard et al. .......... 310/12.29 |
| 6,762,516 B2 | * | 7/2004 | Maruyama ............. 310/12.04 |

(Continued)

FOREIGN PATENT DOCUMENTS

DE    1 613 402 A    1/1971

(Continued)

*Primary Examiner*—Tran N Nguyen
(74) *Attorney, Agent, or Firm*—Henry M. Feiereisen; Ursula B. Day

(57) ABSTRACT

The moving parts of an electric motor are intended to be cooled more effectively and in a simple manner. For this purpose, the invention proposes an electric motor with a first motor part (1) and a second motor part, which interacts magnetically with the first motor part (1) and with respect to which the first motor part is capable of moving in two opposite movement directions (A, B). The electric motor is also equipped with a cooling system, which is fitted to the first motor part (1) and which has a cooling medium for cooling at least the first motor part. The cooling medium is moved, exclusively by means of acceleration of the first motor part (1), in one of the two opposite movement directions (A, B) in the cooling system. The movement can be triggered, for example, by the dead weight in an open cooling cycle system or else by means of a piston (23) in a closed cooling cycle system. The movement of the motor is therefore also used for pumping the coolant and additional electrical components such as fans can be dispensed with.

12 Claims, 2 Drawing Sheets

U.S. PATENT DOCUMENTS 7,282,820 B2 * 10/2007 Emoto .................... 310/12.15
2002/0140298 A1 * 10/2002 Maruyama .................. 310/54

FOREIGN PATENT DOCUMENTS

| | | | |
|---|---|---|---|
| GB | 1 162 613 A | 8/1969 | |
| JP | 5 268 759 A | 10/1993 | |
| JP | 2002/010019 A | 1/2002 | |

* cited by examiner

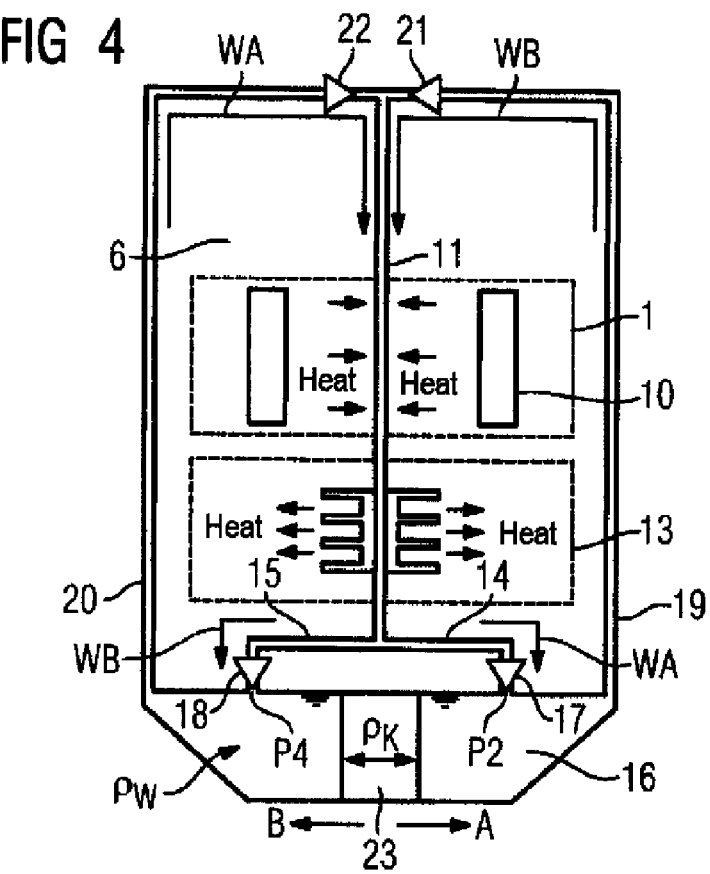
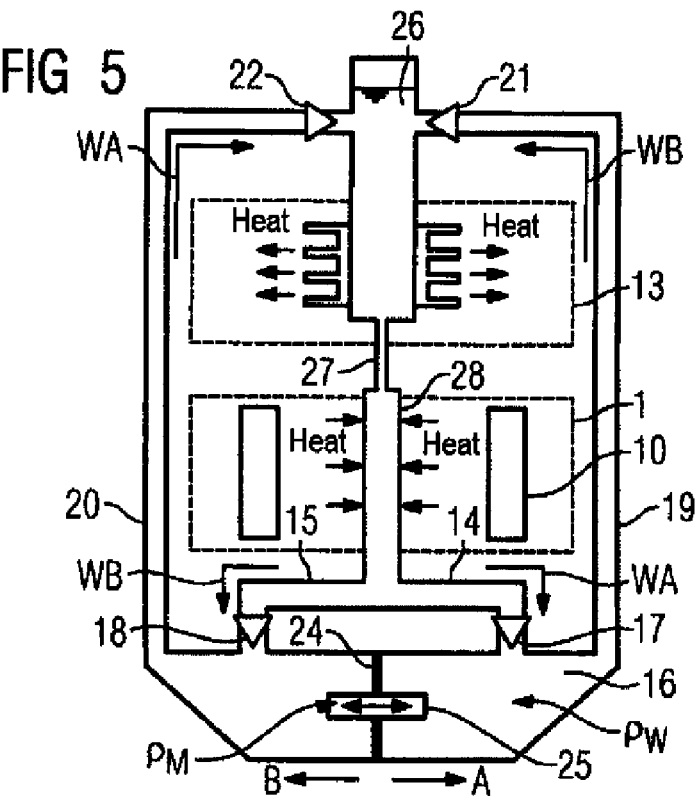

ELECTRIC MOTOR WITH SELF-COOLING

BACKGROUND OF THE INVENTION

The present invention relates to an electric motor with a first motor part, a second motor part, which interacts magnetically with the first motor part and with respect to which the first motor part is capable of being moved in two opposite movement directions, and a cooling system, which is fitted to the first motor part and which has a cooling medium for cooling at least the first motor part. Furthermore, the present invention relates to a corresponding method for cooling an electric motor.

Electric motors are provided with cooling systems in order to increase utilization. In this case, not only the stationary part of the motor but also the moving part is intended to be cooled. In the case of a rotary motor this is the rotor, and in the case of a linear motor this is generally the primary part.

Cooling with liquids is significantly more efficient than cooling with air or other gases. The cooling medium respectively used is delivered, for example, with the aid of a fan or a feed wheel through cooling pipes of the cooling system. In this case, a choice is also made between internal or external ventilation. In the latter case, the power of the motor is not used for ventilation purposes.

Other possibilities for heat removal consist in the utilization of pure convection or radiation. Furthermore, so-called heat pipes and thermopipes are also used for heat removal.

Precisely in the case of the moving parts of the motor, however, it is difficult to attach or connect the respective cooling equipment. Cooling of the moving part of the motor is therefore often dispensed with, which means losses in terms of power, however.

SUMMARY OF THE INVENTION

The object of the present invention therefore consists in providing a simple and easily manageable cooling system in particular for the moving part of a motor.

This object is achieved according to the invention by an electric motor with a first motor part, a second motor part, which interacts magnetically with the first motor part and with respect to which the first motor part is capable of being moved in two opposite movement directions, and a cooling system, which is fitted to the first motor part and which has a cooling medium for cooling at least the first motor part, being the cooling medium is capable of being moved, exclusively by acceleration of the first motor part, in one of the two opposite movement directions in the cooling system.

In addition, the invention provides a method for cooling an electric motor with a first motor part and a second motor part, which interacts magnetically with the first motor part and with respect to which the first motor part is capable of being moved in two opposite movement directions, and with a cooling system, which is fitted to the first motor part and which has a cooling medium for cooling at least the first motor part, by acceleration of the first motor part with respect to the second motor part in one of the two opposite movement directions, and movement of the cooling medium in the cooling system exclusively by the acceleration of the first motor part.

Advantageously, the heat removal from a moving motor part is possible in a very simple manner since the acceleration of the motor part is also used for moving the cooling medium. There is therefore no need for a special drive for the movement of the cooling medium.

Preferably, the electric motor is in the form of a linear motor, the movable, first motor part preferably being the primary part, in/on which a cooling pipe of the cooling system is arranged. In this case, the to-and-fro movement of the linear motor primary part is used to cool said primary part.

Furthermore, the cooling system can have a cooling pipe with at least one nonreturn or check valve, through which the cooling medium can only pass in one direction. As a result, the efficiency of a cooling system can be increased.

It is also particularly advantageous if the cooling system is in itself closed. This makes it possible to avoid the need for connections to be provided externally, for example in the case of cooling of a moving part of the motor, if the cooling system overall is arranged on the moving part of the motor.

In addition, the cooling system can have a piston in a cooling pipe or vessel, the density of said piston deviating from that of the cooling medium. The piston is then moved in the case of the acceleration of the first motor part in the cooling medium. As a result, in particular also symmetrical cooling systems can be constructed. In addition, the piston can be used for increasing the throughput of cooling medium.

Furthermore, the cooling system can have at least one compensating vessel, in which a gaseous compensating medium is located in addition to the liquid cooling medium. In this case, gravitation can also be used to deliver the cooling medium, in addition to the acceleration of the first motor part.

In a specific embodiment, the cooling system has two pipe sections, which run parallel to one another and open out into one another and which each have a check valve, of which both valves are directed either towards the opening or away from the opening, with the result that the cooling medium only flows in one pipe section in the case of one movement direction of the first motor part and only flows in the other pipe section in the case of the opposite movement direction of the first motor part. In this way, the acceleration of the first motor part can be used not only in one direction but in both directions.

Instead of a freely movable piston, it is also possible for a body whose density deviates from that of the cooling medium to be fixed in a section of the cooling system with the aid of a diaphragm which at least largely covers the inner cross section of the section. In the case of acceleration, the diaphragm is then deflected by the body, as a result of which the cooling medium is delivered through the cooling system.

Furthermore, the cooling system can have a pressure vessel and an expansion section connected thereto, and in this case a section of the first motor part which is to be cooled is cooled by the expansion section. If cooling medium from the pressure vessel then expands in the expansion section, thermodynamic cooling effects are also utilized.

BRIEF DESCRIPTION OF THE DRAWING

The present invention will now be explained in more detail with reference to the attached drawings, in which:

FIG. 4 shows a basic diagram of a water-cooled linear motor with a piston in the cooling system in accordance with a fourth embodiment of the present invention, and FIG. 5 shows a basic diagram of a water-cooled linear motor with additional thermodynamic cooling in accordance with a fifth embodiment.

DETAILED DESCRIPTION OF PREFERRED EMBODIMENTS

The exemplary embodiments outlined in more detail below represent preferred embodiments of the present invention.

Figure 1:
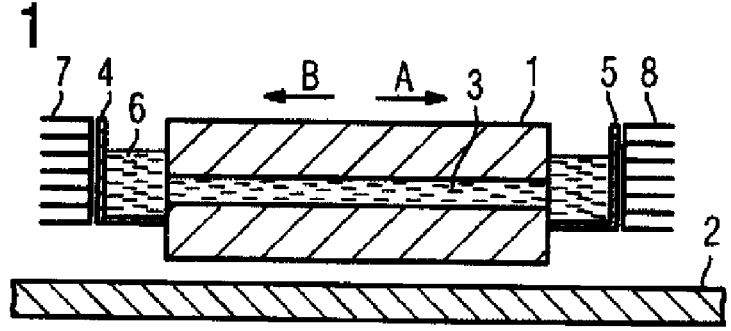
FIG. 1 shows a linear motor according to the invention in accordance with a simple, first embodiment, in cross section.

FIG. 1 illustrates a very simple example of a water-cooled primary part 1 of a linear motor. The primary part 1 is moved, according to the arrow A, over the secondary part 2 of the linear motor towards the right in the drawing or, according to the arrow B, towards the left. A cooling pipe 3 is located parallel to the movement directions A, B in the primary part 1 for cooling the coils. A coolant vessel 4 is located on the left-hand side of the primary part 1, and a coolant vessels is located on the right-hand side. The cooling pipe 3 is connected to the two coolant vessels 4, 5 so as to enable the flow of liquid. The level of the coolant 6 is above the cooling pipe 3 in both coolant vessels 4, 5. Not only the coolant vessels 4, 5 but also the cooling pipe 3 are therefore filled with the cooling medium 6.

The cooling pipe 3 is thermally coupled as best as possible to the coils of the primary part 1. This takes place, for example, by means of it being pressed into the housing of the primary part.

If the primary part 1 is now accelerated in the direction A, the cooling liquid 6 flows through the cooling pipe 3 in the direction B as a result of the acceleration, with the result that the coolant vessel 4 is filled to an ever greater extent and the coolant vessel 5 is emptied to an ever greater extent.

In the other case in which the primary part 1 is accelerated in the direction B towards the left, the cooling liquid flows towards the right in the cooling pipe 3, with the result that the right-hand coolant vessel 5 is filled and the left-hand coolant vessel 4 is emptied. As a result of the flow of cooling liquid 6 in the cooling pipe 3, heat is removed more effectively from the primary part 1. The coolant flow is interrupted if there is no longer any acceleration of the primary part 1. If there is no longer any acceleration, the linear motor now also consumes correspondingly less electrical energy, or none at all, however. For heat removal of the cooling liquid 6, heat sinks or heat exchangers 7, 8 are fitted to the coolant vessels 4 and 5, which heat sinks or heat exchangers emit the heat to the surrounding environment.

Figure 2:
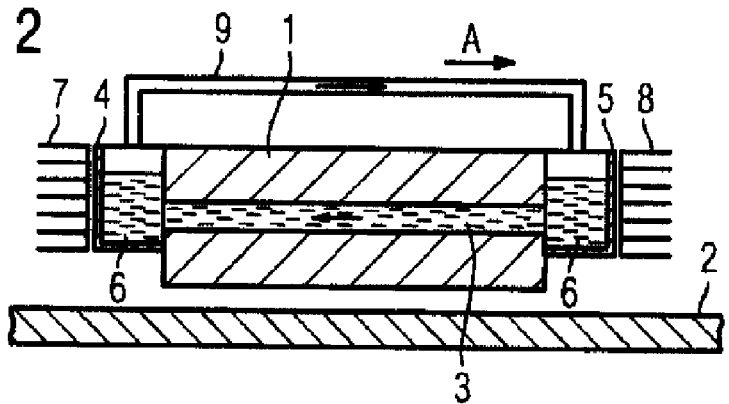
FIG. 2 shows a linear motor with a closed cooling system on the primary part.

FIG. 2 shows a further-developed second embodiment of a linear motor with an autonomous cooling system, likewise in a longitudinal section. The design of the electric motor is substantially similar to that in FIG. 1. In this second embodiment, the coolant system is closed, however. Specifically, the individual coolant vessels 4 and 5 are covered and connected to one another via an air bridge 9. In the example in FIG. 2, the primary part 1 is accelerated towards the right in the direction A. The cooling liquid 6, for example water, therefore flows in the cooling pipe 3 in accordance with the arrow illustrated towards the left. In the air bridge 9, however, the air flows for compensation purposes towards the right from the left-hand coolant vessel 4 into the right-hand coolant vessel 5. In the case of acceleration in the opposite direction in the direction B, the flow directions in the cooling pipe 3 and in the air bridge 9 are correspondingly reversed. Furthermore, gravitation ensures compensation of the levels in the two coolant vessels 4, 5.

Figure 3:
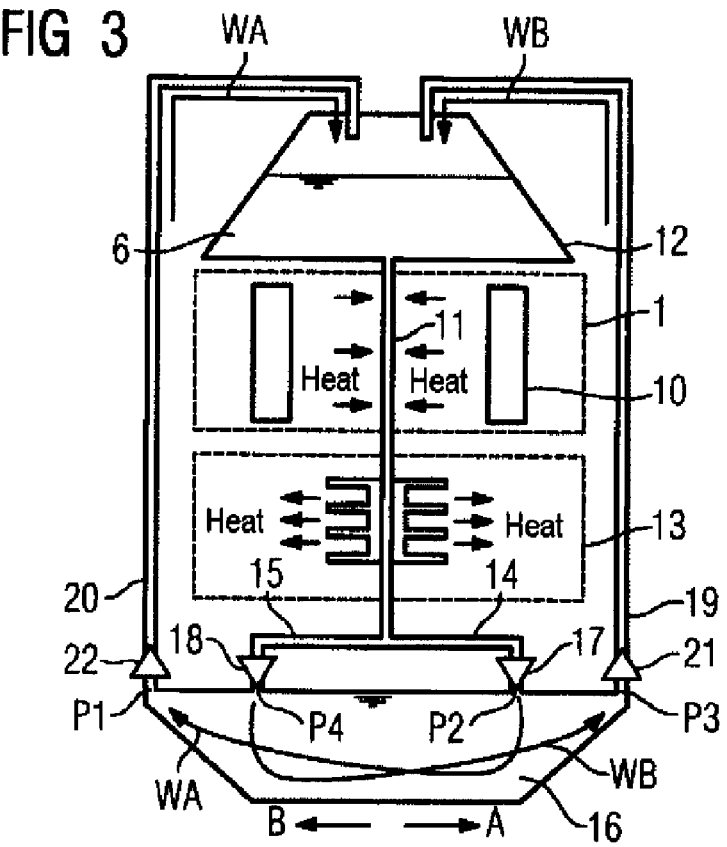
FIG. 3 shows a basic diagram of a water-cooled linear motor with cooling pipeline which are provided with check valves in accordance with a third embodiment of the present invention.

In order to improve the cooling power, the cooling principle in FIG. 2 (closed cooling system) can be developed further corresponding to FIG. 3. This drawing again shows a primary part 1, which is accelerated in the directions A and B. A secondary part is not illustrated here. Coils 10, which have a certain power loss, are arranged in the primary part 1. The resultant heat is conducted to a cooling pipe 11 arranged perpendicular to the movement directions A, B. The cooling liquid 6 originates from a liquid vessel 12, which is arranged at the upper end of the cooling pipe 11 and is connected thereto.

The cooling liquid 6 flows downwards in the cooling pipe 11 and flows through an air-cooled heat exchanger 13 below the primary part 1. Below the heat exchanger 13, the cooling pipe 11 branches into a first cooling pipe section 14 in direction A and into a second cooling pipe section 15 in direction B. The two cooling pipe sections 14, 15 open out into a lower liquid vessel 16 at points P2 and P4, respectively. Furthermore, the two cooling pipe sections 14, 15 are provided with nonreturn or check valves 17, 18, which only allow the cooling liquid to flow into the lower liquid vessel 16 from the respective cooling pipe section 14, 15.

In each case rising pipes 19, 20 are arranged at the outermost left-hand end (point P1) and at the outermost right-hand end (point P3) of the liquid vessel 16. The two rising pipes are provided with check valves 21, 22, with the result that the cooling liquid 6 can only flow from the lower liquid vessel 16 into the rising pipes 19, 20. The two rising pipes 19, 20 open out into the upper liquid vessel 12. The upper liquid vessel 12 is not completely filled with cooling liquid 6, but is partially filled with air or another gas.

In the case of an acceleration of the primary part 1 together with the two-way cooling system in the direction A, the pressure rises at point P1, where the left-hand rising pipe 20 is fitted to the lower liquid vessel 16. Correspondingly, the cooling liquid 6 in the rising pipe 20 rises upwards and is conducted into the upper liquid vessel 12. At the same time, a considerable reduced pressure is produced at point P2 in the lower liquid vessel 16 in comparison with point P1, with the result that cooling liquid then flows from the upper liquid vessel 6 through the cooling pipe 11 and the cooling pipe section 14 into the lower liquid vessel 16. The corresponding cooling liquid flow is denoted by WA.

In the other case in which the primary part 1 together with the cooling system is accelerated in the direction B, the pressure rises at point P3, where the right-hand rising pipe 19 is coupled to the lower liquid vessel 16. At the same time, the pressure lowers at point P4, where the left-hand cooling pipe section 15 opens out into the lower liquid vessel 16. This results in the coolant flow WB illustrated through the left-hand cooling pipe section 15 and the right-hand rising pipe 19. In the case of a to-and-fro movement of the linear motor, liquid is therefore continuously pumped into the upper liquid vessel 12 and flows from there downwards through the primary part 1, with the result that heat can be removed from said primary part 1.

A third embodiment of a water-cooled linear motor primary part is illustrated in FIG. 4. The design is similar to that in FIG. 3. The primary part 1 with its coil 10 emits heat to a vertically arranged cooling pipe 11. The heat exchanger 13 therebeneath removes the heat from the cooling pipe 11. Then, the cooling pipe is again split into the cooling pipe sections 14 and 15 with the check valves 17 and 18. The cooling pipe sections 14, 15 open out into the lower water vessel 16, at whose outer ends the rising pipes 19, 20 rise upwards, with said rising pipes 19, 20 likewise being provided with check valves 21 and 22. The two rising pipes 19, 20 together open out into the cooling pipe 11, without a liquid vessel being interposed here. This results in a closed cycle system with a single vessel, which is filled completely with cooling liquid or water.

A piston 23 is located in the liquid vessel 16, which is in the form of a pipe, for example. This piston 23 has a density $\rho_k$, while the density of the cooling liquid or the water is $\rho_w$.

It is assumed for the functional example below that $\rho_k > \rho_w$. If the primary part 1 including the cooling cycle is now accelerated in the direction A, the piston 23, whose density is greater than that of the cooling liquid, is moved towards the left (towards the right for $\rho_k < \rho_w$), with the result that the cooling liquid is pushed into the rising pipe 20 since it cannot enter the cooling pipe section 15 owing to the check valve 18. At the same time, a reduced pressure is produced in the vessel space to the right of the piston, with the result that the cooling liquid flows through the cooling pipe 11 and the right-hand cooling pipe section 14 corresponding to the liquid flow WA.

If the primary part 1 is accelerated towards the left in the direction B, on the other hand, the piston 23 is moved towards the right and pushes the liquid into the right-hand rising pipe 19, through the cooling pipe 11 and the left-hand cooling pipe section 15 back into the left-hand part of the cooling liquid vessel 16.

In the case of this closed cooling cycle system as well, either the coolant cycle WA or the coolant cycle WB is therefore set in motion, depending on the acceleration direction. The two cycles ensure a flow through the primary part and therefore removal of heat therefrom.

The cooling system in the example in FIG. 4 has until now been considered as a vertical system with rising pipes corresponding to the example in FIG. 3. The closed cycle system of the fourth exemplary embodiment also functions, however, if the pipes illustrated in FIG. 4 are arranged horizontally. In this case, too, the piston 23 is moved in the event of an acceleration in one of the directions A, B and therefore delivers the coolant.

A fifth exemplary embodiment of a water-cooled linear motor with a closed cooling cycle is illustrated schematically in FIG. 5. The design substantially corresponds to that in FIG. 4, for which reason no description is given of the individual components which remain unchanged. A first substantial change in comparison with the fourth exemplary embodiment consists in the fact that a diaphragm 24, to which a mass or a body 25 is fixed, is arranged in the liquid vessel 16 instead of the piston 23. The movement principle of the body 25 is the same as that of the piston 23 in FIG. 4. The body 25 has a density $\rho_M$ which differs from the density $\rho_W$ of the water or the liquid. If the density $\rho_M$ of the body 25 is greater than the density $\rho_W$ of the cooling liquid, in the case of an acceleration in the direction A said body 25 is moved in the opposite direction B. If the density $\rho_M$ of the body 25 is less than the density $\rho_W$ of the cooling liquid, however, it likewise moves in the direction A in the case of an acceleration of the primary part 1 in the direction A. In the case of an acceleration of the primary part 1 in the direction B, the opposite movements of the body 25 take place.

The diaphragm 24 is deflected corresponding to the movement of the body 25. Since it separates the liquid vessel 16 into a left-hand and a right-hand half, which are not connected to one another in such a way that liquid can flow, again one of the two cooling cycles WA or WB corresponding to the example in FIG. 4 is triggered in the case of an acceleration of the primary part 1, depending on the direction.

A further substantial change in the fifth exemplary embodiment in comparison with the fourth exemplary embodiment consists in the fact that the central cooling pipe 11 is in this case replaced by a pressure vessel 26, a constriction 27 in the pipe and an expansion section 28. The thermodynamic principle that a medium is cooled in the case of a drop in pressure, for example as a result of evaporation of the cooling liquid, is utilized for cooling purposes by this pressure vessel 26 with the adjoining expansion section 28.

The operation of the closed cooling cycle system illustrated in FIG. 5 can be outlined as follows. As a result of the acceleration of the primary part 1 for example in the case of a to-and-fro movement, the diaphragm 24 to which the body 25 is fitted acts as a pump and pumps cooling liquid into the pressure vessel 26. There, the temperature rises to a value T1 and the pressure rises to a value p1. The heat exchanger 13 is thermally coupled to the pressure vessel 26 owing to the increased temperature. As a result, the degree of efficiency in the removal of heat of the cooling liquid is increased. The cooling liquid passes through the constriction 27 into the expansion section 28, where it can expand corresponding to a polytropic change of state and preferably evaporates. In this case, the pressure is reduced to the value p2. Likewise, the temperature is reduced to a temperature T2. The primary part 1 or a coil 10 is thermally coupled to this expansion section 28. Since the expansion section 28 has a lower temperature T2, the removal of heat thereof is correspondingly more effective.

In order to improve the removal of heat, under certain circumstances it may be advantageous not to position the valves 21, 22 directly at the pressure vessel 26 but in the vicinity of the liquid vessel 16, as in the example in FIG. 3. In this case, the liquid in the outer pipes or rising pipelines 20, 21 also has the high temperature T1, with the result that additional removal of heat towards the surrounding environment can be carried out there.

The abovementioned exemplary embodiments are in part represented as two-way systems, which demonstrate pumping action in the case of accelerations in both directions. However, the cooling systems can also be in the form of one-way systems, with the coolant only being pumped in one direction in the case of acceleration. Furthermore, the systems can also be equipped with a plurality of pipes which run parallel to one another and possibly have flows in opposite directions, in order to improve the cooling effect. In general, all of the individual elements of the cooling systems such as the piston, diaphragm, thermodynamic elements etc. can be combined with one another as desired in order to obtain a corresponding cooling cycle.

The closed cooling systems proposed have advantages in particular in the case of so-called pick-and-place machines, where conventional water cooling systems are undesirable since these machines are permanently in motion and therefore constantly pump the coolant. As a result, additional electrical component parts such as air fans or the like can be saved. Nevertheless, the heat can be transported away from the motor effectively.

Illustrated examples apply for acceleration in the case of linear movement. The same principle can be applied to rotary motors by the angular acceleration of the rotor being utilized.

What is claimed is:

1. An electric motor, comprising:
   a first motor part;
   a second motor part which interacts magnetically with the first motor part, with the first motor part being movable in relation to the second motor part in two opposite movement directions; and
   a cooling system attached to the first motor part and constructed for flow of a cooling medium to cool at least the first motor part, wherein the cooling medium is caused to move in the cooling system exclusively as a result of acceleration of the first motor part in one of the two opposite movement directions.

2. The electric motor of claim 1, constructed in the form of a linear motor, with the first motor part representing a primary part, said cooling system including a cooling pipe provided in or on the primary part.

3. The electric motor of claim 1, wherein the cooling system has a cooling pipe, and at least one check valve disposed in the cooling pipe and configured to allow passage of the cooling medium only in one direction.

4. The electric motor of claim 1, wherein the cooling system is a closed cooling system.

5. The electric motor of claim 1, wherein the cooling system has a piston received in a cooling pipe or vessel and defined by a density which deviates from a density of the cooling medium.

6. The electric motor of claim 1, further comprising a body defined by a density which deviates from a density of the cooling medium, and a diaphragm securing the body in a section of the cooling system and covering at least a major part of an inner cross section of the section.

7. The electric motor of claim 1, wherein the cooling medium is a liquid cooling medium, said cooling system having at least one compensating vessel which contains a gaseous compensating medium in addition to the liquid cooling medium.

8. The electric motor of claim 1, wherein the cooling system has two pipe sections disposed in parallel relationship to one another and fluidly communicating with one another at a port, and two check valves respectively disposed in the pipe sections, with both check valves being directed either towards the port or away from the port so that the cooling medium flows in one of the pipe sections when the first motor part moves in one of the opposite movement directions, and flows in the other one of the pipe sections when the first motor part moves in the other one of the opposite movement directions.

9. The electric motor of claim 1, wherein the cooling system includes a pressure vessel and an expansion section which is connected to the pressure vessel so that the expansion section cools a section to be cooled of the first motor part.

10. A method for cooling an electric motor with a first motor part and a second motor part which interacts magnetically with the first motor part, with the first motor part being movable in relation to the second motor part in two opposite movement directions, and with a cooling system attached to the first motor part and constructed for flow of a cooling medium to cool at least the first motor part, said method comprising the steps of:

accelerating the first motor part in relation to the second motor part in one of the two opposite movement directions; and moving the cooling medium in the cooling system exclusively as a result of the acceleration of the first motor part.

11. The method of claim 10, wherein the cooling medium flows in a cooling pipe when the first motor part is accelerated in one of the opposite movement directions, and a flow of the cooling medium is blocked when the first motor part accelerates in the other one of the opposite movement directions.

12. The method of claim 10, wherein the cooling medium is caused to move by a piston which is displaced in the cooling medium when the first motor part is accelerated.

* * * * *

UNITED STATES PATENT AND TRADEMARK OFFICE
CERTIFICATE OF CORRECTION

PATENT NO. : 7,859,143 B2
APPLICATION NO. : 12/438066
DATED : December 28, 2010
INVENTOR(S) : Zeljko Jajtic et al.

It is certified that error appears in the above-identified patent and that said Letters Patent is hereby corrected as shown below:

Title page, item [56] References Cited, FOREIGN PATENT DOCUMENTS

On page 2 of the cover page COLUMN 2:

Replace "JP 2002/010019 A" with -- JP 2002/010619 A --.

Signed and Sealed this
Eighth Day of March, 2011

David J. Kappos
*Director of the United States Patent and Trademark Office*